Figure 1:
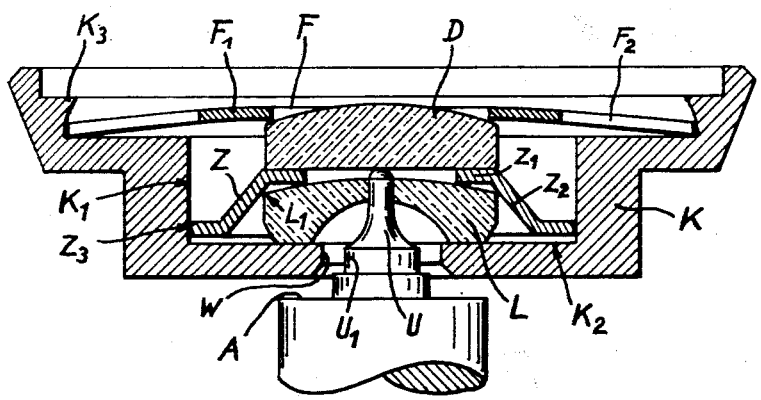

Oct. 11, 1955  E. STEIN  2,720,077

SHOCKPROOF BEARING

Filed Nov. 19, 1952

Inventor:
E. Stein

United States Patent Office 2,720,077
Patented Oct. 11, 1955

2,720,077

SHOCKPROOF BEARING

Ernst Stein, Schwenningen am Neckar, Germany

Application November 19, 1952, Serial No. 321,427

Claims priority, application Germany November 27, 1951

1 Claim. (Cl. 58—140)

With time-pieces and similar fine-mechanical apparatus, which are liable to be subjected to occasional impacts it is of advanage for the bearing places of sensitive parts, that is more particularly the escapements, to be secured against impact. Where for journals and step bearings separate members, for instance holed stone and cover stone, are provided, according to a known proposal both stones have been supported relative to one another by an intermediate member having conical surfaces in such a manner that a spring holding the cover stone also centers the holed stone. The same spring thus cushions impacts in the axial and also the radial direction.

The invention also makes use of the intermediate member provided with conical surfaces, just referred to, but avoids the tilting or twisting of the holed stone relative to the axis of the spindle, which occurs in the known constructions, and furthermore requires in practice only particularly simple parts, more particularly only unset stones, and finally makes possible an extremely simple putting together and an equally simple taking apart of the individual parts. According to the invention this is obtained by a centering cup provided with a flat bottom cut away in the middle and continuing as an inwardly coned wall, which is inserted in the cylindrical bore of the bearing body so as to be axially movable, but substantially without radial clearance, in such a manner that it resets with its cone on the upper edge of the holed stone which is freely displaceable on the bottom of the bore of the bearing body, whilst its bottom lies between holed stone and cover stone.

The bottom of the bore of the bearing body is preferably flat and therefore allows the flat bottomed holed stone to move freely in this plane, in which it is held by the action of the spring pressing on the cover stone, through the intermediary of the centering cup. Corresponding to the parallel displacement of the escapement axis, which may occur in the case of any impacts, the holed stone will also suffer only parallel displacement. The entirely superfluous and even detrimental twisting and tilting of the holed stone, such as occurs with the known arrangements, is out of the question. On the other hand with the arrangement according to the invention the centering cup will, on the holed stone being displaced, be raised at one side, that is will be forced upwards in the cylindrical bore of the bearing body and can take up an inclined position, for which purpose its outer edge or surface is preferably strongly rounded and polished. The centering cup need not rest on the bottom of the bore in the bearing body, but bears solely on the holed stone.

The invention also covers the case in which by interchange the conical surface is provided on the holed stone and the centering cup rests on it with an inwardly directed edge.

Figure 2:
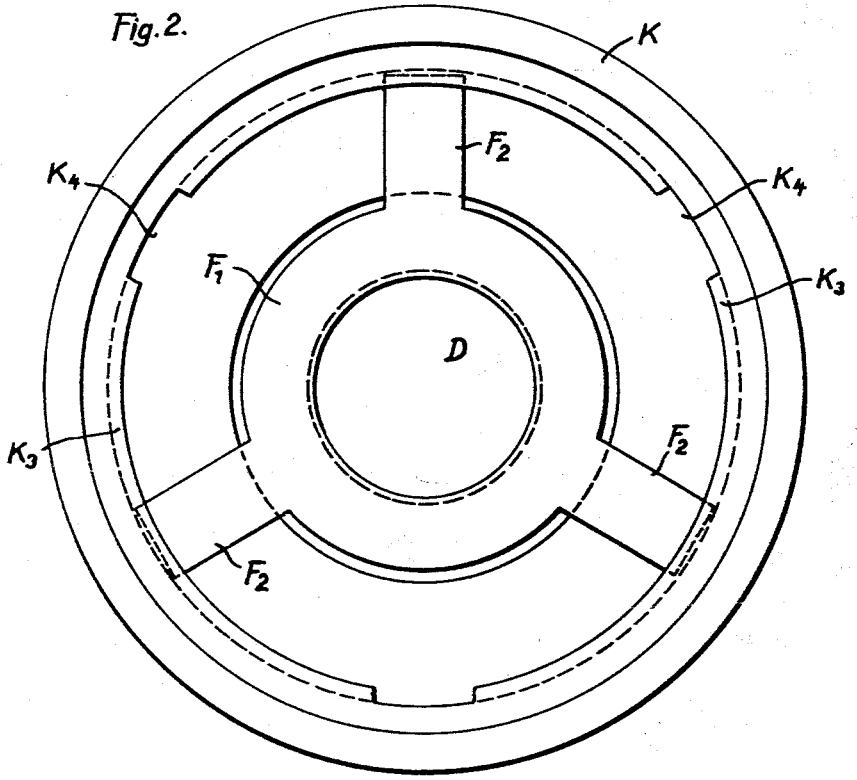

The accompanying drawing elucidates the invention with reference to the constructional example of an escapement spindle bearing, of which Figure 1 shows the greatly magnified axial section and Figure 2 a plan view.

The bearing body K, say a portion of the plate, a potence or the needle of the rosette has a smooth cylindrical bore $K_1$ with a flat bottom $K_2$, into which are placed loosely one above the other—a remarkably simple feature of the construction according to the invention—the holed stone L, also with a flat bottom, which may be without setting or set in a simple ring; above it the centering cup Z which has a flat bottom $Z_1$ cut out for the passage of the escapement spindle U and merging into the conical wall $Z_2$, with which it rests on the edge $L_1$ of the holed stone. At its periphery $Z_3$ the centering cup Z is guided without any substantial clearance in the bore $K_1$ and is rounded and polished for enabling it to move easily, so that even in case of tilting it will not jam.

On the bottom $Z_1$ of the centering cup rests the cover stone D which also has a flat bottom surface and is itself held by a compression spring F inserted with preliminary stressing. This spring F consists of the ring-shaped part $F_1$ with attached arms $F_2$ which ensure soft springing. For easy fixing and equally easy releasability during repairs the arms $F_2$ engage in the present example under an inwardly turned-over rim $K_3$ of the bearing body K. Cut-away places $K_4$ at this rim $K_3$ enable, after a slight rotation, the spring F to be freely removed and inserted. The bottom $Z_1$ of the centering cup Z ensures a certain distance between the two stones L and D, whereby a hollow space for the reception of oil is formed.

The mode of operation is as follows: On an impulse in the radial direction occurring, the holed stone L can yield through parallel displacement, but presses with its rim $L_1$ against the smooth, conical inner surface of the centering cup Z and raises the latter from one side. At the same time the centering cup experiences a parallel displacement upwards or cants slightly, in any case lifting the cover stone D in opposition to the pressure of the spring F. The effect of the radial impact is limited by the collar $U_1$ on the escapement spindle U, which comes against the aperture wall W. The sensitive pivot end of the escapement spindle is thus effectively relieved of load. After the impact has ended, the spring F forces all parts back into the illustrated initial position.

On the occurrence of impacts in the axial direction the pivot end of the escapement spindle U presses directly against the cover stone D and raises it somewhat, until the shoulder A of the escapement spindle bears against the bearing body K, whereby complete protection is again provided. Impacts in an inclined direction are taken up with equal certainty by the possibility of the simultaneous lifting of the centering cup Z and the direct lifting of the cover stone D through the yielding of the spring F.

The centering cup Z has, as illustrated, practically uniform wall thickness and can therefore be made simply by stamping and pressing from a piece of sheet metal. Costly turning operations are eliminated. The conical internal surface need not necessarily correspond exactly to a conical surface, but may suitably be formed as part of a spherical surface or some similar surface evolved through the rotation of a curved line.

I claim:

A spring spindle bearing for fine-mechanical apparatus more particularly for escapements in time-measuring appliances, comprising in combination, a frame with a cylindrical bore, a holed stone for the escapement spindle freely displaceable in radial direction on the bottom of said bore, a cover stone acting on the rounded end of said spindle, a spring acting on said cover stone and a centering member arranged between the cover stone and the hole stone, said centering member being formed as a uniformly thin-walled cup of inwardly conical shape, its flat bottom having a middle aperture for the upper end of the escapement spindle and its conical side wall resting on the hole stone and continuing in a flange, said flange reaching down almost to the bottom of the cylindrical bore of the frame and having practically the same diameter as said bore.

References Cited in the file of this patent

UNITED STATES PATENTS

| | | |
|---|---|---|
| 1,976,181 | Marti | Oct. 9, 1934 |
| 2,372,972 | Morf | Apr. 3, 1945 |

FOREIGN PATENTS

| | | |
|---|---|---|
| 175,721 | Switzerland | May 16, 1935 |
| 984,582 | France | Feb. 28, 1951 |